United States Patent Office 3,520,862
Patented July 21, 1970

3,520,862
PROCESS FOR PRODUCING COPOLYMER OF ETHYLENE WITH STYRENE
Isoji Taniguchi, Kanji Yoshikawa, and Yoshiharu Tatsugami, Niihama-shi, Japan, assignors to Sumitomo Chemical Company, Ltd., Osaka, Japan, a corporation of Japan
No Drawing. Continuation-in-part of application Ser. No. 304,963, Aug. 27, 1963. This application Aug. 21, 1967, Ser. No. 661,801
Claims priority, application Japan, Aug. 27, 1962, 37/36,733
Int. Cl. C08f 15/04
U.S. Cl. 260—88.2       5 Claims

ABSTRACT OF THE DISCLOSURE

A process for producing a copolymer of ethylene with styrene containing 1 to 25% by weight of styrene units in the molecule, which comprises contacting ethylene with styrene under a pressure not lower than 800 atmospheres at a temperature not lower than 100° C. in the presence of at least one catalyst selected from the compounds having the general formulae:

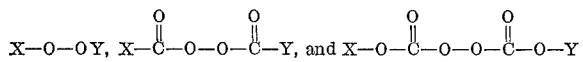

wherein X is a phenyl or alkyl group and Y is a hydrogen atom or an alkyl group. The copolymer is a clear, transparent solid with excellent impact strength.

---

This is a continuation-in-part application of Ser. No. 304,963, filed on Aug. 27, 1963, and now abandoned.

This invention relates to a novel solid copolymer of ethylene with styrene, which is excellent in processability, tensile strength, impact strength and transparency, and to a process for producing the same.

As is well known, polystyrene is superior in transparency and tensile strength, but inferior in impact strength, whereas a high pressure process polyethylene is rather superior in impact strength but inferior in transparency and tensile strength to polystyrene. Further, the transparency of the film made of polyethylene is not fully satisfactory. Polyethylene is, generally speaking, poor in elasticity and tends to cause creeping when drawn.

It has also been known that ethylene and styrene can be copolymerized at a high pressure. For instance, British Pat. No. 497,643 discloses that ethylene and styrene are copolymerized by a batch-process at a pressure of 1500 atmospheres and at a temperature of 200° C. for 20 hours in the presence of 0.04% by weight of oxygen, based on the weight of ethylene, and the resulting copolymer containing 40 to 75% by weight of styrene is tough and rubbery. According to U.S. Pat. No. 2,334,195, a semi-solid copolymer is prepared by copolymerizing the two compounds in water or an inert solvent in the presence of oxygen or a peroxide at a pressure of from 100 to 300 atmospheres and at a temperature of 55° to 180° C. British Pat. No. 578,584 teaches that the copolymerization proceeds in water at a temperature of from 60° to 120° C. and at a pressure of 50 atmospheres. U.S. Pat. No. 2,467,234 discloses the copolymerization in the presence of butyl alcohol. U.S. Pat. No. 2,342,400 discloses the copolymerization in an emulsion state at an elevated pressure.

The copolymers prepared by the above-mentioned processes, some of which are semi-solid, have no unique and distinguishing features, as compared with the conventional high-pressure process polyethylene.

Canadian Pat. No. 579,465 discloses that ethylene and styrene can be copolymerized with a coordination catalyst at a temperature of 0°–300° C. at a pressure of 1–200 atmospheres. Further, U.S. Pat. No. 3,058,963 discloses the copolymerization of ethylene and a styrenic compound (the amount being 0.3–6.7% by weight when styrene is used) with an aluminum trialkyl type catalyst. However, the copolymers obtained by these processes, according to the disclosure of said patents, are linear copolymers having a very high melting point (more than 130° C.) and an extremely high molecular weight such that the intrinsic viscosity (in decalin at 125° C.) is 8.0 and the R.S.V. (in decalin at 135° C.) is 15.6–2.0. In fact, said copolymer is greatly different from the ethylene-styrene copolymer of the present invention in structure (branching degree, molecular weight, melting point, intrinsic viscosity, and the like). Further, the former is much inferior in thermal processability to the latter, and the shaped product of the former is also much inferior to that of the latter in transparency, softness and impact strength as shown in Table 2.

Moreover, the so-called low pressure copolymerization processes require the use of an organometallic catalyst which is very expensive and very difficult to handle in a reaction medium free from water, hydroxyl group-containing compounds, oxygen, ketones, esters, aldehydes and the like. In addition, the polymerization products must be washed with methanol and a small amount of hydrochloric acid in a shake tube followed by filtration, and the resulting cake washed with a large amount of methanol or acetone followed by filtration and drying under vacuum or reduced pressure at 65° C. for about 15 hours. Thus, said processes require very complicated steps and are very low in producibility.

The present process, on the other hand, can be simply carried out by using a styrene addition means incorporated into a conventional, high pressure ethylene polymerization apparatus (a batch, semi-batch or continuous system). Furthermore, the present process does not require any particular solvent, and enables after-treatments which are complicated and require a long period of time, such as methanol- or acid-washing to remove the catalyst and subsequent filtration and drying of the product to be all omitted. That is, in the present process, the product can be directly and continuously withdrawn by simply releasing the ethylene pressure. Further, although in the low pressure processes, the recovery and recycling of unreacted styrene, which is a critical factor in industry, must be effected in addition to the recovery of the solvent, in the high pressure process of the present invention, unreacted styrene can be simply recovered together with unreacted ethylene at the time of release of the ethylene pressure and can be easily recycled by maintaining the vapor-liquid equilibrium.

It is an object of the present invention to provide a new and improved copolymer of ethylene with styrene, having highly desirable properties, i.e. excellent transparency, improved rubbery elasticity and high tensile strength.

Another object of the invention is to provide a novel copolymer of ethylene with styrene which can yield films having high transparency, tenacity and flexibility.

Still another object of the invention is to provide a process for producing such copolymer.

Other objects and advnatages will be apparent from the following description.

According to the present invention, ethylene and styrene are copolymerized at a temperature not lower than 100° C. under a pressure not lower than 800 atmospheres in the presence of at least one catalyst selected from the compounds having the general formulae:

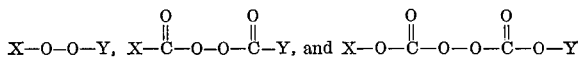

wherein X is a phenyl or alkyl group, and Y is a hydrogen atom or an alkyl group, thereby to produce a copolymer in which the amount of styrene ranges from 1 to 25% by weight.

Typical catalyst compounds belonging to said general formulae are as shown in Table 1.

TABLE 1

| The general formulae | Typical compounds |
| --- | --- |
| X—O—Y | Di-tert.-butyl peroxide, diethyl peroxide, tert.-butyl hydroperoxide. |
| $X-\overset{O}{\underset{\|}{C}}-O-O-\overset{O}{\underset{\|}{C}}-Y$ | Octanoyl peroxide, acetyl peroxide, 2-ethylhexanoyl peroxide. |
| $X-O-\overset{O}{\underset{\|}{C}}-O-O-\overset{O}{\underset{\|}{C}}-O-Y$ | Isopropyl peroxydicarbonate, isoamyl peroxydicarbonate. |

The process of the present invention may be effected in a batch, semi-batch or continuous way. In carrying out the present process, in general, styrene and a catalyst as identified above may be placed in a reactor, and ethylene may then be charged thereinto. Alternatively, styrene may be charged into a mixture of ethylene and the catalyst. The polymerization is effected at a pressure not lower than 800 atmospheres, preferably a pressure of 800 to about 3000 atmospheres, and at a temperature not lower than 100° C., preferably a temperature of 100° to 300° C., more preferably 150° ot 250° C. If the pressure is lower than 800 atmospheres, conversion is low. If the temperature is lower than 100° C., an extremely large amount of the catalyst is needed. If the pressure and the temperature are higher than the maximum levels mentioned above, many difficulties may occur from the viewpoint of apparatus.

In the process of the present invention, it is important and essential that the copolymer produced contains 1 to 25% by weight of styrene units. Therefore, the reaction conditions should be so selected as to fulfill the desired purpose. The amount of styrene to be changed into the copolymerization system varies within a broad range, depending upon other conditions, such as the reaction temperature and pressure. When the production of a copolymer containing a certain proportion of styrene within the specified range is desired, the proportion of the amount of styrene charged to that of ethylene charged should be determined correlatively to the reaction temperature and pressure. In general, 0.1 to 15% by weight of styrene, based upon the weight of ethylene, is introduced into the reactor.

The amount of the catalyst to be charged may vary within a broad range, according to the reaction conditions, such as reaction temperature, reaction pressure, amount of styrene, and kind of the catalyst. Ordinarily, it may be 0.05 to 100% by weight, more preferably 0.1 to 20% by weight, based upon the weight of styrene.

The polymerization reaction is completed within a comparatively short period of time, for example, from a few seconds to about 5 hours. After the completion of polymerization, the resulting copolymer is recovered.

The copolymers of the present invention are composed of ethylene units and styrene units, the latter being 1 to 25% by weight, and have highly desirable properties such as good processability, high tensile strength and excellent transparency, so they are useful for film, electric wire coatings and moulding articles. For example, a film, prepared by an inflation process from the present copolymer consisting of 10% by weight of styrene and 90% by weight of ethylene and having a "melt index" of 3, is more excellent in tensile strength than the film prepared from high pressure process polyethylene.

Ordinarily, the copolymer of the present invention has a melt index of 0.1 to 50, a tensile strength of about 100 to about 400 kg./cm.$^2$, and an elongation of 400 to 1500%.

In Table 2, the properties of the present copolymers are shown. For comparison, those of polyethylene, polystyrene and a prior low pressure process copolymer of ethylene and styrene are also listed in Table 2.

TABLE 2

| Compounds | Item of tests | | | | |
| --- | --- | --- | --- | --- | --- |
| | Melt index | Tensile strength (kg./cm.$^2$) | Elongation (percent) | Transparency (6 sheets) | Film (0.03 mil) impact |
| The high pressure process copolymer (styrene:ethylene=1.5:98.5) | 3 | 180 | 600 | 30 | 60 |
| The high pressure process copolymer (styrene:ethylene=10:90) | 3 | 250 | 700 | 20 | <70 |
| The high pressure process copolymer (styrene:ethylene=25:75) | 3 | 350 | 800 | 15 | <70 |
| High pressure process polyethylene | 2 | 180 | 600 | 30 | 30 |
| Polystyrene | 0.49 | 422 | 0 | 100 | |
| The low pressure process copolymer (styrene:ethylene=10:90) | 0.5 | 220 | 20 | 5 | 30 |

NOTE.—"Melt index" in Table 2 is the index mainly used for polyethylene with respect to its molecular weight, and is defined by the weight (gram) of the test sample extruded for 10 minutes through an orifice of 2.1 mm. in diameter at a temperature of 190° C. under a load of 2160 g. (ASTM, D-1238). Transparency is the value represented by the distance between the material and the film that shows a constant luminosity, when the luminosity of material is measured through the film under a constant illumination.

To illustrate the process of the invention, the following examples are given but they do not limit the scope of the invention.

EXAMPLE 1

A 260-cc. high pressure, stainless steel reaction vessel was flushed repeatedly with oxygen-free ethylene. The vessel was then evacuated and charged with 20 mg. of di-tert.-butyl peroxide and 0.5 g. of styrene. The vessel was then charged with ethylene, and heating and agitation were started. This charge of ethylene was so controlled that the pressure in the vessel was 800 atmospheres at 180° C. After a period of 2 hours, the pressure dropped to 770 atmospheres. The agitation was discontinued, the pressure was released to atmospheric pressure, and the vessel was cooled to ambient temperature, thereby to produce 3.0 g. of a clear, transparent copolymer. The properties of the product were as follows: the styrene content: 2% by weight, melt index: 0.4, tensile strength: 240 kg./cm.$^2$, and elongation: 600%.

EXAMPLE 2

Example 1 was repeated except that 20 mg. of di-tert.-butyl peroxide and 2.3 g. of styrene were introduced into the vessel. The vessel was charged with ethylene so as to control the pressure at 1500 atmospheres at a temperature of 180° C. After a period of 90 minutes, the pressure decreased to 1350 atmospheres. Then, 9.5 g. of a clear, transparent copolymer was obtained. The properties of the product were as follows: the styrene content: 11% by weight, melt index: 0.4, tensile strength: 370 kg./cm.$^2$, and elongation: 650%.

EXAMPLE 3

Example 1 was repeated except that 130 mg. of di-tert.-butyl peroxide and 8 g. of styrene were introduced into the vessel, the vessel was charged with ethylene so as to control the pressure at 2500 atmospheres at 180° C., and the reaction was continued for 40 minutes. At the end of the period, the pressure decreased to 2340 atmospheres. Thus, 12 g. of a clear, transparent copolymer was obtained. The properties of the product were as follows: the styrene content: 25% by weight, melt index: 2, tensile strength: 280 kg./cm.$^2$, and elongation: 1200%.

EXAMPLE 4

Example 1 was repeated except that 2.0 g. of octanoyl peroxide and 0.8 g. of styrene were introduced into the vessel. The vessel was charged with ethylene to 1500 atmospheres at 100° C. After a period of 30 minutes, the pressure decreased to 1450 atmospheres. Thus, 6.5 g. of a clear, transparent copolymer was obtained, which had the following properties: styrene content: 5% by weight, melt index: 0.8, tensile strength: 330 kg./cm.$^2$, and elongation: 580%.

EXAMPLE 5

Example 1 was repeated except that 10 mg. of di-tert.-butyl peroxide and 0.3 g. of styrene were introduced into the vessel, and the vessel was charged with ethylene to 1500 atmospheres at 280° C. After a period of 10 minutes, the pressure dropped to 1480 atmospheres. Thus, 1.5 g. of a clear, transparent copolymer was obtained, which had the following properties: styrene content: 2% by weight, melt index: 38, tensile strength: 250 kg./cm.$^2$, and elongation: 60%.

EXAMPLE 6

Example 1 was repeated except that 500 mg. of isopropyl peroxydicarbonate and 2.0 g. of styrene were introduced into the vessel, and the vessel was charged with ethylene to 1500 atmospheres at 100° C. After a period of 40 minutes, the pressure dropped to 1460 atmospheres. Thus, 2.9 g. of a clear, transparent copolymer was obtained. The properties of the product were as follows: styrene content: 6% by weight, melt index: 0.2, tensile strength: 360 kg./cm.$^2$, and elongation: 600%.

What we claim is:

1. A process for producing a copolymer of ethylene with styrene, which comprises heating a mixture consisting essentially of ethylene and styrene in a solvent-free system under a pressure not lower than 800 atmospheres at a temperature not lower than 100° C. in the presence of at least one catalyst selected from the group consisting of the compounds having the general formulae:

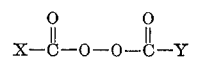
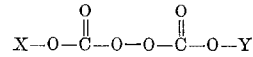

wherein X is selected from the class consisting of phenyl and alkyl groups, and Y is selected from the class consisting of a hydrogen atom and alkyl groups, thereby to produce a solid transparent copolymer containing 1 to 25% by weight of styrene units in the molecule.

2. A process for producing a copolymer of ethylene with styrene which comprises heating a mixture consisting essentially of ethylene and styrene, the latter being present in an amount of 0.1 to 15% by weight based on the weight of ethylene in a solvent-free system, under a pressure of at least 800 atmospheres at a temperature of at least 100° C. in the presence of at least one catalyst selected from the group consisting of the compounds having the general formulae:

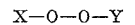
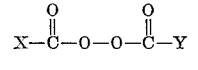
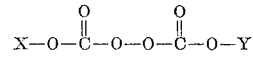

wherein X is selected from the class consisting of phenyl and alkyl groups, and Y is selected from the class consisting of a hydrogen atom and alkyl groups, and controlling the reaction conditions to produce a solid, transparent copolymer containing 1–25% by weight of styrene units based on the weight of the molecule.

3. A solid, transparent copolymer of ethylene with styrene which contains 1–25% by weight of styrene units based on the weight of the molecule prepared by a process according to claim 2.

4. A process according to claim 2 wherein the catalyst is di-tert.-butyl peroxide.

5. A process according to claim 2 wherein the catalyst is octanoyl peroxide and the copolymer contains 5% by weight of styrene.

References Cited

UNITED STATES PATENTS 2,563,631   8/1951   Young _____ 260—669

JOSEPH L. SCHOFER, Primary Examiner

ROGER S. BENJAMIN, Assistant Examiner